US005544816A

United States Patent [19]

Nally et al.

[11] Patent Number: 5,544,816

[45] Date of Patent: Aug. 13, 1996

[54] HOUSING FOR COIL OF SOLENOID-OPERATED FUEL INJECTOR

[75] Inventors: Debora E. Nally, Williamsburg; Bryan C. Hall, Newport News, both of Va.

[73] Assignee: Siemens Automotive L.P., Auburn Hills, Mich.

[21] Appl. No.: 292,455

[22] Filed: Aug. 18, 1994

[51] Int. Cl.$^{6}$ .......................... F02M 51/06; F16K 31/02; B05B 1/30

[52] U.S. Cl. .................................. 239/585.5; 251/129.21

[58] Field of Search ............................. 239/585.1–585.5; 251/129.21, 129.18, 129.15

[56] References Cited

U.S. PATENT DOCUMENTS

| | | | |
|---|---|---|---|
| 4,915,350 | 4/1990 | Babitzka et al. | 239/585.4 X |
| 4,946,132 | 8/1990 | Reiter | 239/585.4 X |
| 4,967,966 | 11/1990 | Babitzka et al. | 239/585.4 |
| 5,174,505 | 12/1992 | Shen | 239/585.1 X |
| 5,190,221 | 3/1993 | Reiter | 239/585.1 X |

FOREIGN PATENT DOCUMENTS

| | | | |
|---|---|---|---|
| 3904448 | 8/1990 | Germany | 239/585.4 |

*Primary Examiner*—Andres Kashnikow
*Assistant Examiner*—Lesley D. Morris
*Attorney, Agent, or Firm*—Russel C. Wells

[57] ABSTRACT

A ferromagnetic housing that encloses the electromagnetic coil to form part of the stator is fabricated from uniform thickness sheet metal to have a cylindrical neck that fits onto the ferromagnetic fuel inlet tube of a top feed fuel injector, a shoulder extending outwardly from the neck and a cylindrical body extending from the shoulder to circumferentially bound the electromagnetic coil. A single through-hole is provided in the housing to provide for passage of both electrical terminals from the electromagnetic coil.

12 Claims, 2 Drawing Sheets

HOUSING FOR COIL OF SOLENOID-OPERATED FUEL INJECTOR

FIELD OF THE INVENTION

This invention relates to solenoid operated fuel injectors that are used in fuel injection systems of internal combustion engines.

BACKGROUND AND SUMMARY OF THE INVENTION

Traditionally fuel injectors have consisted of a power group and a valve group. The power group has a fuel inlet tube/pole, a magnetic coil, and a housing. The main function of the housing has been to serve as a magnetic flux return path for the coil. However, additional functions of the housing include: maintaining injector shape even under compression/installation force; forming a structural bridge between components such as the inlet tube and valve body by attachment to such components, such as by crimping for example; aligning the inlet tube to the armature face; providing electrical coil terminal passage, typically in the form of two circular holes in the housing through which respective terminals pass from the coil to an external electrical connector; and forming a hermetic surface for O-ring sealing. This has led to a rather complicated housing shape with tight tolerances, basically dictating that the housing be manufactured from thick, machined solid metal or powdered metal.

A trend for down-sizing engine compartments has forced components to become smaller, and one area of size reduction has been the injector outer diameter. Smaller outer diameter injectors still require maintaining the same inlet tube outer diameter (for standard size O-ring usage in sealing to a fuel rail socket), and this makes it difficult to create a single standard electrical terminal passage through the wall of a typical housing.

Additionally, the traditional housing is typically greater than two millimeters in thickness so that maintaining this thickness while trying to down-size the outer diameter can result in performance loss since room for the coil must necessarily decrease.

New structural solutions for alignment and attachment of the power group components, in addition to different hermetic sealing concepts have led to less strict demands on the housing. Designs that have taken advantage of minimal housing design requirements by utilizing strap or frame concepts for a housing, although low in cost and easy to manufacture, limit the cross-sectional area required for magnetic flux path; structural/installation force deflection requirements are still present; because the straps or frames do not cover the entire 360 degrees, they must be thicker, resulting in a minimal reduction in injector outer diameter. Additionally, the structural integrity of the power group can shift due to the components being exposed to the pressure of the overmold material injected during the overmold process to encapsulate the coil and housing.

Other concepts have included processing flat sheets of metal 1 to 1.5 mm thick for housings. This has helped in minimizing component shift during overmold, but at the disadvantage of requiring two individual passages for electrical terminals due to terminal passage geometry requirements. This requires two additional components and a weld or solder joint.

The present invention relates to a low cost, thinner walled housing for an injector power group and several manufacturing methods to accomplish this shape. This results in reduced injector outer diameter, limits components exposure to high overmolding pressures, and hence limits component shift caused by the overmolding operation, and has a geometry conducive to electrical terminal blade passage.

Various features, advantages and the inventive aspects will be seen in the ensuing description and claims which are accompanied by drawings that disclose a presently preferred exemplary embodiment of the invention according to the best mode contemplated at the present time for carrying out the invention.

DESCRIPTION OF THE PREFERRED EMBODIMENT

Figure 1:
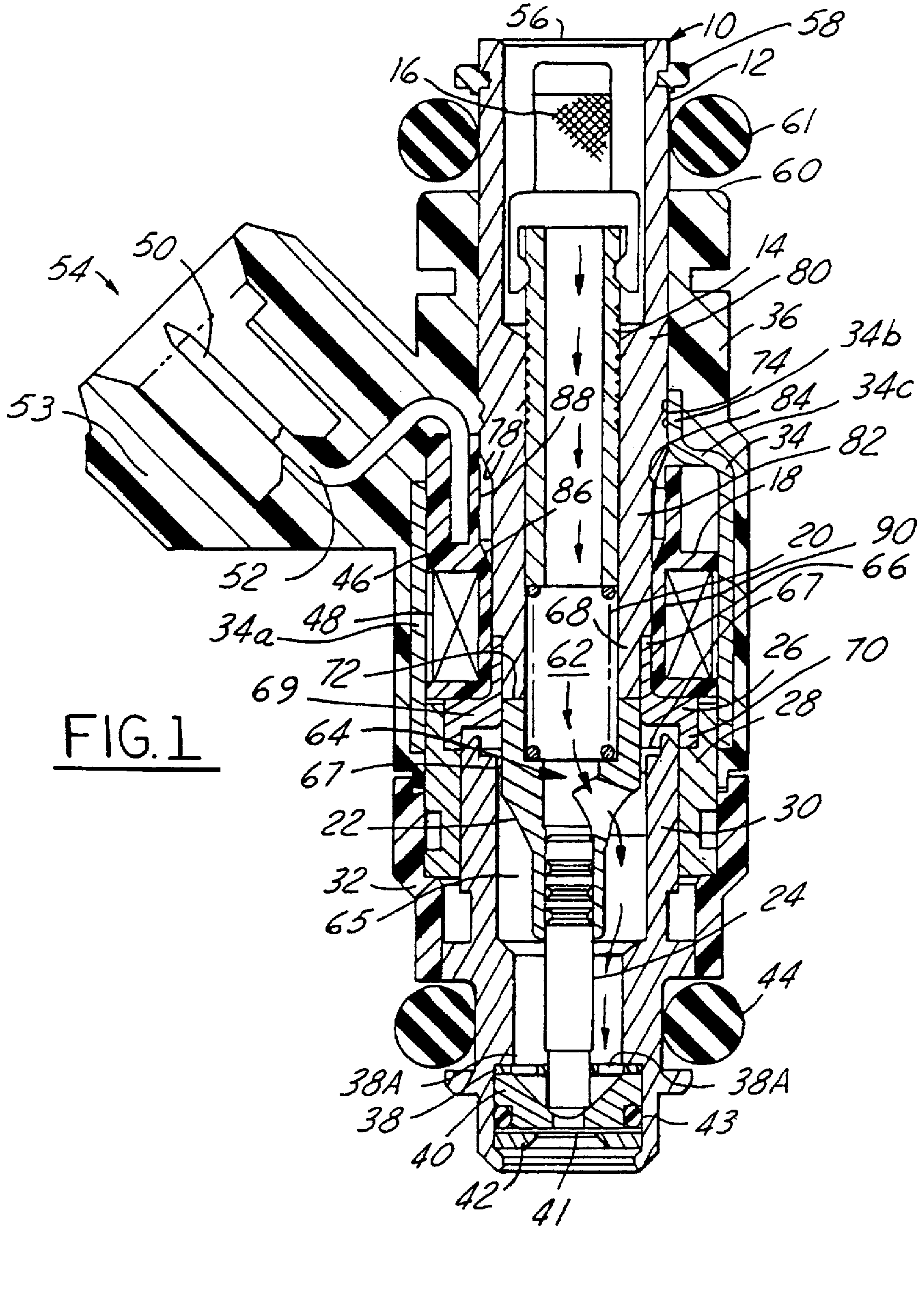
FIG. 1 is a longitudinal cross-sectional view through an exemplary fuel injector embodying principles of the present invention.

FIG. 1 shows an exemplary fuel injector 10 comprising a number of parts including a fuel inlet tube 12, an adjustment tube 14, a filter assembly 16, a coil assembly 18, a coil spring 20, an armature 22, a needle valve 24, a non-magnetic shell 26, a valve body shell 28, a valve body 30, a plastic shell 32, a coil assembly housing 34, a non-metallic cover 36, a needle guide member 38, a valve seat member 40, a thin disk orifice member 41, a backup retainer member 42, a small O-ring seal 43, and a large O-ring seal 44.

The needle guide member 38, the valve seat member 40, the thin disk orifice member 41, the backup retainer member 42 and the small O-ring seal 43 form a stack that is disposed at the nozzle end of fuel injector 10, as shown in a number of commonly assigned patents, such as U.S. Pat. No. 5,174,505. Armature 22 and needle valve 24 are joined together to form an armature/needle valve assembly. Coil assembly 18 comprises a plastic bobbin 46 on which an electromagnetic coil 48 is wound. Respective terminations of coil 48 connect to respective terminals 50, 52 that are shaped and, in cooperation with a surround 53 formed as an integral part of cover 36 to, form an electrical connector 54 for connecting the fuel injector to an electronic control circuit (not shown) that operates the fuel injector.

Fuel inlet tube 12 is ferromagnetic and comprises a fuel inlet opening 56 at the exposed upper end. A ring 58 that is disposed around the outside of fuel inlet tube 12 just below fuel inlet opening 56 cooperates with an end surface 60 of cover 36 and the intervening O.D. of tube 12 to form a groove for an O-ring seal 61 that is typically used to seal the fuel injector inlet to a cup, or socket, in an associated fuel rail (not shown). The lower O-ring 44 is for providing a fluid-tight seal with a port in an engine induction intake system (not shown) when the fuel injector is installed on an engine. Filter assembly 16 is fitted to the open upper end of adjustment tube 14 to filter any particulate material larger than a certain size from fuel entering through inlet opening 56 before the fuel enters adjustment tube 14.

In the calibrated fuel injector, adjustment tube 14 has been positioned axially to an axial location within fuel inlet tube 12 that compresses spring 20 to a desired bias force that urges the armature/needle valve such that the rounded tip end of needle valve 24 is seated on valve seat member 40 to close the central hole through the valve seat. Preferably, tubes 14 and 12 are crimped together to maintain their relative axial positioning after adjustment calibration has been performed.

After passing through adjustment tube 14, fuel enters a space 62 that is cooperatively defined by confronting ends of inlet tube 12 and armature 22 and that contains spring 20. Armature 22 comprises a passageway 64 that communicates space 62 with a passageway 65 in valve body 30, and guide member 38 contains fuel passage holes 38A. This allows fuel to flow from space 62 through passageways 64, 65 to valve seat member 40. This fuel flow path is indicated by the succession of arrows in FIG. 1.

Non-ferromagnetic shell 26 is telescopically fitted on and joined to the lower end of inlet tube 12, as by a hermetic weld. Shell 26 has a tubular neck 66 that telescopes over a tubular neck 68 at the lower end of fuel inlet tube 12. Shell 26 also has a shoulder 69 that extends radially outwardly from neck 66. Shoulder 69 itself has a short circular rim 70 at its outer margin extending axially toward the nozzle end of the injector. Valve body shell 28 is ferromagnetic and is joined in fluid-tight manner to non-ferromagnetic shell 26, preferably also by a hermetic laser weld.

The upper end of valve body 30 fits closely inside the lower end of valve body shell 28 and these two parts are joined together in fluid-tight manner, preferably by laser welding. Armature 22 is guided by the inside wall of valve body 30 for axial reciprocation, specifically on the I.D. of an eyelet 67 that is attached to the upper end of valve body 30. Further axial guidance of the armature/needle valve assembly is provided by a central guide hole in member 38 through which needle valve 24 passes.

In the closed position shown in FIG. 1, a small working gap 72 exists between the annular end face of neck 68 of fuel inlet tube 12 and the confronting annular end face of armature 22. Coil housing 34 and tube 12 are in contact at 74 and constitute a stator structure that is associated with coil assembly 18. Non-ferromagnetic shell 26 assures that when coil 48 is energized, the magnetic flux will follow a path that includes armature 22. Starting at the lower axial end of housing 34, where it is joined with valve body shell 28 by a hermetic laser weld, the magnetic circuit extends through valve body shell 28, valve body 30 and eyelet 67 to armature 22, and from armature 22 across working gap 72 to inlet tube 12, and back to housing 34. When coil 48 is energized, the spring force on armature 22 is overcome and the armature is attracted toward inlet tube 12 reducing working gap 72. This unseats needle valve 24 from seat member 40 to open the fuel injector so fuel is now injected from the injector's nozzle. When the coil ceases to be energized, spring 20 pushes the armature/needle valve closed on seat member 40.

Fuel inlet tube 12 is shown to comprise a frustoconical shoulder 78 that divides its O.D. into a larger diameter portion 80 and a smaller diameter portion 82. Bobbin 46 comprises a central through-hole 84 that has a frustoconical shoulder 86 that divides the through-hole into a larger diameter portion 88 and a smaller diameter portion 90. Shoulder 86 has a frustoconical shape complementary to that of shoulder 78.

FIG. 1 shows shoulders 78 and 86 to be axially spaced apart, and it also shows a portion of through-hole 84 and a portion of the O.D. of fuel inlet tube 12 to be mutually axially overlapping. That overlapping portion of through-hole 84 consists of shoulder 86 and a portion of the larger diameter portion 88 of the through-hole immediately above shoulder 86. That overlapping portion of the O.D. of tube 12 consists of shoulder 78 and a portion of the smaller diameter portion 82 of the tube. The significance of this concerns steps in the process of assembling coil assembly 18, fuel inlet tube 12, and shells 26 and 28, as disclosed in the commonly assigned patent application having U.S. Ser. No. 08/292,456 of Bryan C. Hall, "Coil for Small Diameter Welded Fuel Injector", filed on the same date. Reference may be had to that disclosure if the reader desires further details of that invention.

Plastic shell 32 is assembled onto the fuel injector after the valve group and the power group have been joined together, but before O-ring 44 is placed in its groove around the outside of valve body 30 proximate the nozzle. The shell is retained in place without any separate fasteners, as by a press-fit or a snap-fit, to one of parts 28 and 30, and after the shell has been properly located, assembly of O-ring 44 onto valve body 30 captures the shell on the fuel injector. The shell provides concealment of the underlying bare metal of parts 28 and 30.

The present invention relates to details of housing 34 and its relationship with other component parts of fuel injector 10. Housing 34 is fabricated from sheet metal of uniform thickness to a generally cylindrical shape that comprises a cylindrical body *34a*, a cylindrical neck *34b*, and a shoulder *34c* extending between body *34a* and neck *34b*. Body *34a* circumferentially bounds coil assembly 18 while neck *34b* circumferentially bounds a portion of the O.D. of fuel inlet tube 12 that protrudes outwardly from through-hole 84 of coil assembly 18. Housing 34 is dimensioned for a close, but non-interference, fit over previously assembled components of the power group. After housing 34 has been so placed, neck *34b* is joined to fuel inlet tube 12, such as by welding or crimping, and the lower axial end margin of body *34a* is joined to the O.D. of part 28 where the former overlaps the latter, also by a similar joining operation. Shoulder *34c* merges with neck *34b* via a ninety degree radius and with body *34a* by a like radius although the latter is outwardly convex and the former, outwardly concave.

Figure 2:
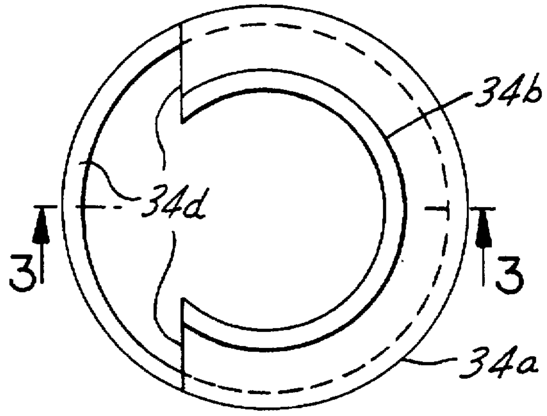
FIG. 2 is an enlarged top plan view of the housing by itself.
Figure 3:
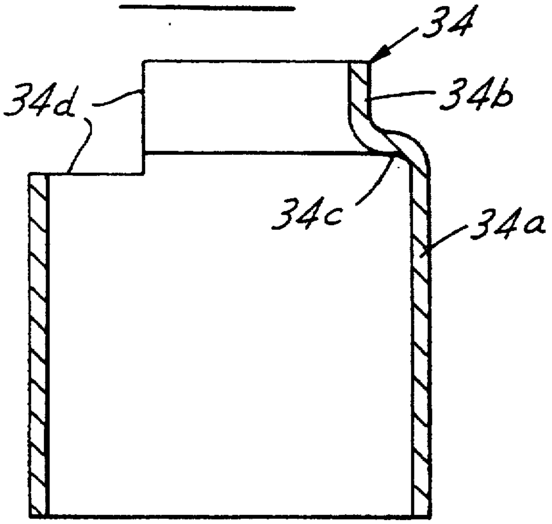
FIG. 3 is a cross-sectional view in the direction of arrows of 3—3 in FIG. 2.
Figure 6:
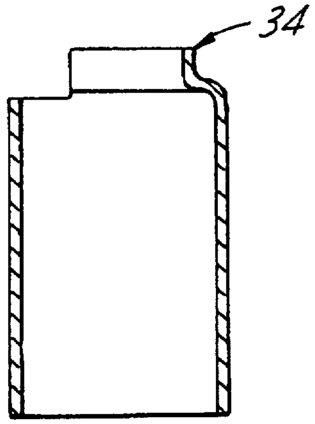

As can be seen in FIGS. 2 and 3, a through-hole *34d* is provided in the wall of housing 34 to provide for passage of electrical terminals 50, 52 from coil assembly 18 to connector plug 54. Advantageously, this can be a single through-hole that subtends only an acute angle about an imaginary longitudinal axis of the housing about which both body *34a* and neck *34b* are coaxial. The illustrated through-hole eliminates the entirety of both neck *34b* and shoulder *34c* in this subtended region. Other than said through-hole *34d*, the housing 34, as illustrated in FIGS. 3, 6, and 7, is tubular with the body *34a*, neck *34b* and shoulder *34c* being imperforate.

Figure 4:
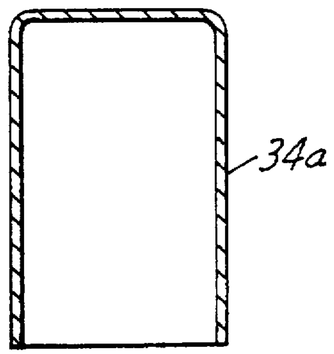
FIGS. 4, 5, and 6 are cross-sectional views illustrating various stages for one method of making the housing.
Figure 5:
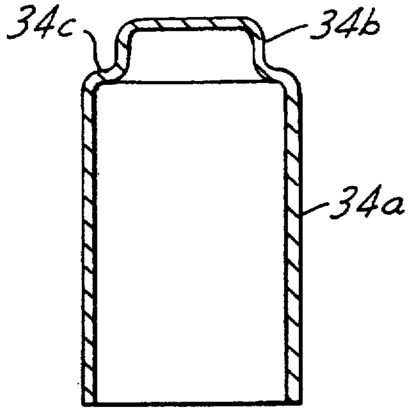

A satisfactory housing 34 can be fabricated from uniform thickness sheet material having a thickness in the range of from about 0.50 mm to 0.95 mm. A close fit between the housing and the top of coil assembly 18 minimizes or even precludes the possibility of intrusion of encapsulant during the process of injection molding cover 36 and this is advantageous in minimizing the exposure of internal components to high pressure, hot fluent, material and consequently minimizing concerns about shift/reliability. FIGS. 4–6 illustrate a process for fabricating housing 34 by metal drawing processes. FIG. 4 shows a first draw that creates body 34*a*; FIG. 5, a second draw that creates shoulders 34*c* and neck 34*b*; and FIG. 6 an operation that removes material to create the final shape described above with reference to FIGS. 2 and 3. The creation of the open end of neck 34*b* and through-hole 34*d* can be performed by milling and then deburring. Alternatively, the step performed in going from FIG. 5 to FIG. 6 may comprise a punch and trim operation.

Still another method of fabricating housing 34 comprises die-cutting the flat sheet material and then rolling and forming to a final shape. The resulting construction would have a seam where the rolled edges come together and this seam may either be left open or alternatively welded close. Any of these processes can produce a reduced thickness housing in the thickness range specified above resulting in reduced diameter of the fuel injector.

Figure 7:
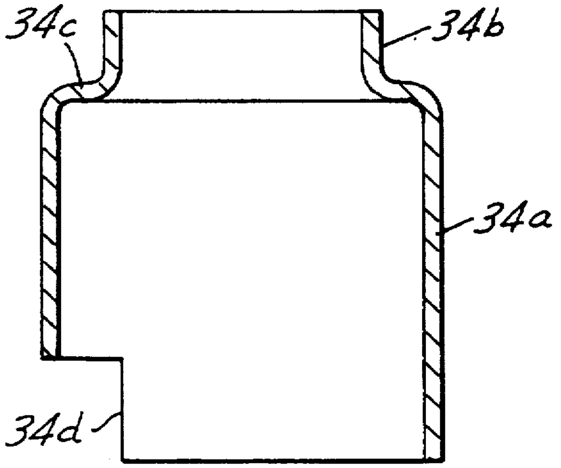
FIG. 7 is a view similar to FIG. 3 illustrating an alternate embodiment housing.

FIG. 7 shows an alternate form of housing that can be used in bottom-feed injectors where there is simply a ferromagnetic core rather than a fuel inlet tube 12. Through-hole 34*d* is created in the bottom margin of body 34*a* so that terminals may come out through the side of the injector closer to the nozzle than in the case of the top-feed fuel injector shown in FIG. 1.

While a presently preferred embodiment of the invention has been illustrated and described, it is to be appreciated that principles of the invention apply to all equivalent constructions and methods that fall within the scope of the following claims.

What is claimed is:

1. An electrically operated fuel injector for injecting fuel into an internal combustion engine comprising an internal passage within said fuel injector for conveying fuel from a fuel inlet at which fuel enters the fuel injector to a nozzle at which fuel is ejected from the fuel injector, a stator structure, an electromagnetic coil having an axial through-hole containing said stator structure, said coil forming one part of said stator structure that forms a portion of a magnetic circuit for magnetic flux generated by said coil, a tubular, cylindrical housing having a longitudinal axis and a uniform wall thickness that circumferentially bounds said coil and forms another part of said stator structure, said housing being a cylindrical body overlapping and joined to a portion of said stator structure, a cylindrical neck on said housing circumferentially bounding and joined to said stator structure, a shoulder extending between said neck and said body, including curved bends for merging with said body and said neck, single through-hole means extending through at least one of said neck, shoulder, and body of said housing, said through-hole subtending an angle about said longitudinal axis of said housing, and electrical terminal means projecting from said coil through said single through-hole means.

2. A fuel injector as set forth in claim 1 wherein said single through-hole eliminates said shoulder and said neck in said subtended angle.

3. A fuel injector as set forth in claim 1 wherein said single through-hole eliminates a marginal edge portion of said body said subtended angle.

4. An electrically operated fuel injector for injecting fuel into an internal combustion engine comprising an internal passage within said fuel injector for conveying fuel from a fuel inlet at which fuel enters the fuel injector to a nozzle at which fuel is injected from the fuel injector, an electromagnetic coil having an axial through-hole containing a stator member that is one part of a stator structure that forms a portion of a magnetic circuit for magnetic flux generated by said coil, a cylindrical housing that circumferentially bounds said coil and forms another part of said stator structure, a mechanism that is internal to said fuel injector for selectively opening and closing said internal passage and that includes an armature and a valve, at least a portion of said internal passage being contained within valve body structure of the fuel injector, another portion of said magnetic circuit that includes said armature is associated with said stator such that a working gap is provided between said armature and said stator member for enabling said armature to operate said valve in accordance with the selective energizing of said coil to selectively open and close said internal passage, said armature being axially reciprocated toward and away from said stator member by the selective energizing of said coil, wherein:

said stator member projects axially outwardly of said coil from one end of said through-hole to present an exposed O.D. surface, said housing is formed from uniform thickness sheet metal to comprise a cylindrical neck circumferentially bounding and joined to said exposed O.D. surface of said stator member, a cylindrical body circumferentially bounding said coil and overlapping and joined to a portion of said valve body structure, and a shoulder extending between said neck and said body, including curved bends for merging with said body and said neck, through-hole means extending through at least one of said neck, shoulder, and body of said housing, and electrical terminal means projecting from said coil through said through-hole means, in that said through-hole means comprises a single through-hole that subtends an acute angle about an imaginary longitudinal axis of said housing, and said shoulder and said neck are eliminated in this subtended angle.

5. A fuel injector as set forth in claim 4 wherein said metal has a thickness from about 0.50 mm to about 0.95 mm.

6. A fuel injector as set forth in claim 4 wherein said neck, said body, and said shoulder are otherwise imperforate.

7. A fuel injector as set forth in claim 4 wherein said curved bends are ninety degree bends.

8. An electrically operated fuel injector for injecting fuel into an internal combustion engine comprising an internal passage within said fuel injector for conveying fuel from a fuel inlet at which fuel enters the fuel injector to a nozzle at which fuel is injected from the fuel injector, an electromagnetic coil having an axial through-hole containing a stator member that is one part of a stator structure that forms a portion of a magnetic circuit for magnetic flux generated by said coil, a cylindrical housing that circumferentially bounds said coil and forms another part of said stator structure, a mechanism that is internal to said fuel injector for selectively opening and closing said internal passage and that includes an armature and a valve, at least a portion of said internal passage being contained within valve body structure of the fuel injector, another portion of said magnetic circuit that includes said armature is associated with said stator such that a working gap is provided between said armature and said stator member for enabling said armature to operate said valve in accordance with the selective energizing of said coil to selectively open and close said internal passage, said armature being axially reciprocated toward and away from said stator member by the selective energizing of said coil, characterized in that said stator member projects axially outwardly of said coil from one end of said through-hole to present an exposed O.D. surface, said housing is formed from uniform thickness sheet metal to comprise a cylindrical neck circumferentially bounding and joined to said exposed O.D. surface of said stator member, a cylindrical body circumferentially bounding said coil and overlapping and joined to a portion of said valve body structure, and a shoulder extending between said neck and said body, including curved bends for merging with said body and said neck, through-hole means extending through at least one of said neck, shoulder, and body of said housing, and electrical terminal means projecting from said coil through said through-hole means, in that said through-hole means comprises a single through-hole that subtends an acute angle about an imaginary longitudinal axis of said housing, and a marginal edge portion of said body is eliminated in this subtended angle.

9. A fuel injector as set forth in claim 8 wherein said metal has a thickness from about 0.50 mm to about 0.95 mm.

10. A fuel injector as set forth in claim 8 wherein said neck, said body, and said shoulder are otherwise imperforate.

11. A fuel injector as set forth in claim 8 wherein said curved bends are ninety degree bends.

12. In a fuel injector having a tubular stator member coaxial with an armature member, an electromagnetic coil assembly having a coil wound on a bobbin member encircling a portion of the stator member, the bobbin member having at least two terminal members respectively connected to the ends of the coil, the stator member, armature member, coil assembly forming a magnetic circuit, a housing member comprising:

a tubular cylindrical body open at one end and having a uniform wall thickness circumferentially bounding the electromagnetic coil assembly and forming a part of the magnetic circuit;

a shoulder at the other end of said body and radially extending from said body forming an opening for abutting the stator member and adapted to be welded thereto, and a single through-hole means in said shoulder subtends an angle about a longitudinal axis of said housing, and a marginal edge portion of said shoulder is eliminated in this subtended angle for receiving the terminal members.

* * * * *